US009232195B2

(12) United States Patent
Lang et al.

(10) Patent No.: US 9,232,195 B2
(45) Date of Patent: Jan. 5, 2016

(54) MONITORING OF THE CLOSE PROXIMITY AROUND A COMMERCIAL VEHICLE

(75) Inventors: Werner Lang, Ergersheim (DE); Stefan Bauer, Gerhardshofen (DE)

(73) Assignee: MEKRA LANG GMBH & CO. KG, Fuerth (DE)

( * ) Notice: Subject to any disclaimer, the term of this patent is extended or adjusted under 35 U.S.C. 154(b) by 357 days.

(21) Appl. No.: 13/983,264

(22) PCT Filed: Feb. 10, 2012

(86) PCT No.: PCT/EP2012/000613
§ 371 (c)(1),
(2), (4) Date: Aug. 1, 2013

(87) PCT Pub. No.: WO2012/107238
PCT Pub. Date: Aug. 16, 2012

(65) Prior Publication Data
US 2013/0314539 A1    Nov. 28, 2013

(30) Foreign Application Priority Data
Feb. 11, 2011    (DE) .......................... 10 2011 011 048

(51) Int. Cl.
*H04N 7/18*    (2006.01)
*B60R 1/00*    (2006.01)
*G08G 1/16*    (2006.01)

(52) U.S. Cl.
CPC .. *H04N 7/18* (2013.01); *B60R 1/00* (2013.01); *H04N 7/181* (2013.01); *B60R 2300/8026* (2013.01)

(58) Field of Classification Search
CPC .... B60R 1/00; B60R 2300/105; B60R 11/04; B60R 2300/802; H04N 7/181
USPC .......................................................... 348/148
See application file for complete search history.

(56) References Cited

U.S. PATENT DOCUMENTS 5,670,935 A * 9/1997 Schofield ............... B60N 2/002
340/435
5,760,828 A    6/1998 Cortes
(Continued)

FOREIGN PATENT DOCUMENTS

| DE | 19539642 A1 | 11/1996 |
|---|---|---|
| DE | 69509040 | 12/1999 |

(Continued)

OTHER PUBLICATIONS

International Search Report from PCT/EP2012/000613.
(Continued)

*Primary Examiner* — Sath V Perungavoor
*Assistant Examiner* — Howard D Brown, Jr.
(74) *Attorney, Agent, or Firm* — J-TEK LAW PLLC; Jeffrey D. Tekanic; Scott T. Wakeman (57) ABSTRACT

A system for capturing and displaying not directly-viewable spaces near a vehicle includes an apparatus for image capturing and an apparatus for image display. The apparatus for image capturing captures at least two arbitrary points Q and R. A ground plane is spanned by the Cartesian coordinates xv and yv, and xv lies in the vehicle middle plane. The display displays an image that includes an image Q' of the point Q and an image R' of the point R on a display plane spanned by the Cartesian coordinates xv' and yv', with xv' lying on a reproduction of the vehicle middle plane. A projection QR, xv of the vector QR onto xv and a projection Q'R', xv' of a vector Q'R' onto xv' have the same direction, and a projection QR, yv of the vector QR onto yv and a projection Q'R', yv' of a vector Q'R' onto yv' have the same direction.

17 Claims, 7 Drawing Sheets

(56) References Cited

U.S. PATENT DOCUMENTS

| | | | |
|---|---|---|---|
| 6,268,803 B1 * | 7/2001 | Gunderson | B60Q 9/006 180/168 |
| 6,693,524 B1 | 2/2004 | Payne | |
| 7,079,017 B2 | 7/2006 | Lang et al. | |
| 7,454,128 B2 | 11/2008 | Lang et al. | |
| 7,574,287 B2 | 8/2009 | Lang et al. | |
| 7,697,055 B2 | 4/2010 | Imoto et al. | |
| 7,825,951 B2 | 11/2010 | Lang et al. | |
| 8,624,716 B2 | 1/2014 | Englander | |
| 8,953,011 B2 | 2/2015 | Lang et al. | |
| 2001/0052845 A1 | 12/2001 | Weis et al. | |
| 2003/0085999 A1 | 5/2003 | Okamoto et al. | |
| 2003/0108222 A1 * | 6/2003 | Sato | H04N 7/183 382/104 |
| 2003/0122930 A1 * | 7/2003 | Schofield | B60R 1/00 348/148 |
| 2004/0004541 A1 | 1/2004 | Hong | |
| 2004/0036768 A1 | 2/2004 | Green | |
| 2004/0169762 A1 | 9/2004 | Imoto | |
| 2004/0223074 A1 | 11/2004 | Takada | |
| 2005/0083405 A1 | 4/2005 | Imoto et al. | |
| 2005/0083427 A1 | 4/2005 | Imoto | |
| 2006/0215020 A1 | 9/2006 | Mori et al. | |
| 2006/0251502 A1 | 11/2006 | Scharfenberger | |
| 2007/0209436 A1 | 9/2007 | Akita et al. | |
| 2008/0106908 A1 * | 5/2008 | Englander | B60Q 1/24 362/481 |
| 2008/0122597 A1 | 5/2008 | Englander | |
| 2008/0180351 A1 | 7/2008 | He | |
| 2008/0246843 A1 | 10/2008 | Nagata et al. | |
| 2008/0276191 A1 | 11/2008 | Breed | |
| 2009/0213037 A1 | 8/2009 | Schon | |
| 2009/0273941 A1 * | 11/2009 | Englander | B60Q 1/24 362/464 |
| 2009/0290369 A1 | 11/2009 | Schofield et al. | |
| 2010/0091379 A1 | 4/2010 | Lang et al. | |
| 2010/0117815 A1 | 5/2010 | Deline et al. | |
| 2010/0171828 A1 * | 7/2010 | Ishii | B60R 1/00 348/135 |
| 2010/0238288 A1 | 9/2010 | Klaerner et al. | |
| 2011/0080277 A1 | 4/2011 | Traylor et al. | |
| 2011/0115913 A1 | 5/2011 | Lang et al. | |
| 2011/0317049 A1 | 12/2011 | Kurane et al. | |
| 2012/0013742 A1 | 1/2012 | Fairchild et al. | |
| 2012/0069184 A1 | 3/2012 | Hottmann | |
| 2012/0154591 A1 | 6/2012 | Baur et al. | |
| 2012/0200664 A1 | 8/2012 | Lang et al. | |
| 2013/0038735 A1 | 2/2013 | Nishiguchi et al. | |
| 2013/0314539 A1 | 11/2013 | Lang et al. | |
| 2014/0036081 A1 | 2/2014 | Lang et al. | |
| 2014/0058653 A1 | 2/2014 | Schofield et al. | |

FOREIGN PATENT DOCUMENTS

| | | |
|---|---|---|
| DE | 19900498 A | 7/2000 |
| DE | 10254035 | 8/2004 |
| DE | 102005028144 A | 12/2006 |
| DE | 102006020511 A | 11/2007 |
| DE | 102004043257 | 2/2009 |
| DE | 102008034606 A1 | 1/2010 |
| DE | 102011010624 A1 | 8/2012 |
| EP | 1018839 A2 | 7/2000 |
| EP | 1302365 A2 | 4/2003 |
| EP | 1705623 A | 9/2006 |
| EP | 2555518 A | 2/2013 |
| GB | 2351055 A | 12/2000 |
| JP | H0396938 U | 10/1991 |
| JP | H0471939 A | 3/1992 |
| JP | H0884277 A | 3/1996 |
| JP | 2001114048 A | 4/2001 |
| JP | 2002022463 A | 1/2002 |
| JP | 2002109697 A | 4/2002 |
| JP | 2002325191 A | 11/2002 |
| JP | 2003219226 A | 7/2003 |
| JP | 2003320911 A | 11/2003 |
| JP | 2007091186 A | 4/2007 |
| JP | 2007110572 A | 4/2007 |
| JP | 2007282098 A | 10/2007 |
| JP | 2007320359 A | 12/2007 |
| JP | 2008149764 A | 7/2008 |
| JP | 2011095321 A | 5/2011 |
| JP | 2011193485 A | 9/2011 |
| JP | 2012178150 A | 9/2012 |
| KR | 1020100089362 A | 8/2010 |

OTHER PUBLICATIONS

Un-published U.S. Appl. No. 14/173,859.
English translation of International Preliminary Examination Report from parent application No. PCT/EP2012/000613.
Non-final Office Action mailed Jun. 2, 2014 in related U.S. Appl. No. 13/367,985.
German Office Action (and translation thereof) from related application DE 10 2011 011 048.8—dated Jan. 29, 2015.

* cited by examiner

Fig. 1

MONITORING OF THE CLOSE PROXIMITY AROUND A COMMERCIAL VEHICLE

CROSS-REFERENCE

This application is the U.S. National Stage of International Application No. PCT/EP12/000613 filed on Feb. 10, 2012, which claims priority to German patent application no. 10 2011 011 048.8 filed on Feb. 11, 2011.

FIELD OF THE INVENTION

The present invention relates to a viewing system for a commercial vehicle, with which a not directly-viewable space in the surrounding of the commercial vehicle can be monitored, in particular in the close proximity around a commercial vehicle.

PRIOR ART

In particular in commercial vehicles, there are areas around the vehicle which can not be directly viewed by a driver sitting on the driver's seat of the commercial vehicle. Such not directly-viewable zones in the area around the vehicle represent a danger potential in street traffic because a driver may not see objects or persons located in those zones. The driver thus may not take into account such unseen objects or persons during his/her driving maneuvers, and this can lead to accidents. There are legal rules about which areas around the commercial vehicle must be made viewable by means or devices for indirect viewing. These rules relate in particular to close proximities, i.e. those areas that directly border the commercial vehicle and extend a certain dimension therefrom in the lateral direction(s) towards the rear. Such means or devices for indirect viewing are typically mirrors, which mitigate the problem of the non-viewability of the field in the close proximity around the commercial vehicle.

Therefore, for commercial vehicles, such as e.g., trucks or delivery vehicles, among others a primary mirror is prescribed on the driver's side and on the passenger's side, with which the vehicle driver can see a level and horizontal part of the road surface of a certain width, which extends from a legally-stipulated distance behind the vehicle driver's eye point up to the horizon.

In addition, in trucks and other commercial vehicles, areas, so-called fields of view, are required to be viewable, which fields of view are usually reproduced by wide-angle mirrors. An area behind the eye view point of the driver is viewed with wide-angle mirrors in a certain length in the longitudinal direction of the vehicle, which area is wider than the area viewable by the primary mirror, but must extend only a certain length along the vehicle.

This means that, for the depiction of the areas around a commercial vehicle, image information necessary for the initiation of a driving maneuver is divided onto a plurality of mirrors. Further, due to the different lengths of the legally-prescribed fields of view, these mirrors have different and sometimes very small curvature radii, so that the depiction of the close proximity around the commercial vehicle is also severely distorted. Therefore, a driver must perceive a plurality of different pieces of image information, one for each of the various depictions, to initiate a driving maneuver and draw the correct conclusion from this image information. This complexity of the conveyed information produces a risk of overwhelming the driver, in particular in difficult driving situations, and thus represents a safety danger.

Further, to replace mirrors, viewing systems for trucks and other commercial vehicles have been developed, with which areas around the vehicle can be observed in a clear and simple manner for the vehicle driver. At the same time, the influence of the airflow of the vehicle during driving is minimized in that no protruding mirrors, which influence the airflow, must be provided on the vehicle. In addition to at least one capture unit, which can be realized by a camera or other image sensors, such viewing systems include a display unit in the driver's cabin, e.g., a display. The images captured by the capture unit are depicted on the display unit(s) in the driver's cabin.

For example, in the not-yet published DE 10 2011 010 624.3, such a viewing system for a commercial vehicle is described, with the assistance of which legally-prescribed fields of view can be reproduced, in particular, e.g., the field of view of a primary mirror and a wide-angle mirror. In the system described therein, at least two of the fields of view, which are legally-prescribed for permanent display during driving operations, are displayed permanently and in real time on the display unit in the driver's cabin. The fields of view are shown, e.g., side-by-side in a display similar to a mirror arrangement. It is also known to display the fields of view in an overlapping depiction on the display unit.

Furthermore, a system is known from DE 10254035 B4, in which an image of a monitored space lying behind the rear vehicle end is depicted on a screen, which is disposed in a driver's cabin of the vehicle, using a rearview camera disposed at the rear vehicle end. Furthermore, a marking is arranged in or on the screen, which marking is positioned so that the vehicle has a predetermined loading location when approaching a loading station associated with the marking, when an overlapping is attained in the screen between the marking and a predetermined corner or edge of the loading station, which corner or edge clears the lifting loading platform of the vehicle. This means that the rearwardly-directed view field is oriented directly rearward, so that the image plane and the projection plane extend on the depiction substantially perpendicular to the vehicle middle axis.

A vehicle view system is known from DE 19539642 A1, in which the space lying behind the vehicle also can be monitored in a similar manner using a video camera disposed on the back and can be displayed in the commercial vehicle in a depiction, whose projection plane, like the original image plane also, is substantially perpendicular to the vehicle axis.

SUMMARY OF THE INVENTION

Starting therefrom, it is an aspect of the present invention to convey to the driver information concerning possibly-critical objects in a subarea that is not directly viewable by the driver so that the driver can perceive and interpret this information, in particular about areas lying lateral of the commercial vehicle, completely, quickly and correctly.

Accordingly, at least one apparatus for image capturing is provided for each not-viewable and to-be-depicted subarea around the vehicle. The system further includes an apparatus for image data transmission, an apparatus for image data processing and at least one apparatus for image reproduction.

The concept underlying the invention is to convey to the driver when he/she observes the image depicted in the driver's cabin the impression he/she has looked out of the commercial vehicle in a corresponding direction only without obstruction caused by not transparent areas of the commercial vehicle, and thus corresponds to that which a natural perception can be expected without obstruction caused by not transparent areas of the commercial vehicle. This is achieved by spanning the ground plane, to which the depiction relates, with Cartesian coordinates, whose first axis includes a vector, which lies in the vehicle middle plane, as well as spanning the projection plane with Cartesian coordinates, of which again a coordinate vector, which spans the plane, is selected so that it lies on the reproduction of the vehicle middle plane. Further, the projection of a vector, which connects two arbitrary points in the captured image, onto the vector lying in the vehicle middle plane, which vector spans the ground plane, has the same direction as the projection of the image points of these two points onto the vector, which lies on the reproduction of the vehicle middle plane and spans the image plane. Further, this is achieved by applying the same to the projection of the vector, which connects two arbitrary points, onto the Cartesian coordinate vectors, which each span the planes, in the ground plane or the projection plane and these have the same direction.

This leads to a very clear and simply-perceivable depiction of the image for the driver, in particular when the areas in the close proximity of the commercial vehicle, which areas are captured by different capture units, are depicted in the image display transitioning into each other without borders.

The invention is useable, in a particularly meaningful manner, in a commercial vehicle, which is a truck of class N2 or N3 or a bus of class M2 or M3.

Advantageously, the areas, which are captured with the apparatus for image capturing, i.e. the point sets, are selected so that they capture at least one legally-prescribed field of view and/or contain a not directly-visible area front, i.e. in the driving direction forward of the vehicle, and front side, a not directly-visible area lateral in the middle, and/or a not directly-visible area rear.

According to a preferred embodiment, the selection of the depicted area can depend on the driving situation. That means, e.g., during reverse driving one other area can be depicted than during normal forward driving.

According to a preferred embodiment, the units for capturing are disposed at a height H above the road surface, wherein $1.40\,m \leq h \leq 3.80\,m$. In this case, the desired areas of the easily-capturable depiction can be captured without substantial image processing or conversion being required to be performed, since the captures are little or not distorted.

According to a preferred embodiment, it is also possible to overlay additional information in the image display, e.g., to highlight critical objects by image processing or to superimpose distance lines, which indicate the actual distance in meters, e.g., to an obstacle. This additionally helps the driver to guide and recognize objects that may possibly endanger safety.

Moreover, it is possible according to another preferred embodiment to capture not only critical objects, but all their relative speeds to the vehicle and optionally to output a warning in case of a collision danger, e.g., an acoustic warning.

Overall an easy guidance in the displayed image is possible due to the inventive depiction of the reproduced image, because the assembly of the objects in the pictorial depiction substantially corresponds to the arrangement of the objects in the captured area. Moreover, in particular in case of an advantageous selection of the height of the image capture apparatus, a minimal image distortion results so that the invention is usable especially advantageously in commercial vehicles.

According to the advantageous embodiment having additional warning when a critical object is present, the attention of the driver can further be intentionally directed towards possible danger situations.

The designations front, rear, side, right, left, etc., which are used in this description, relate to the forward driving direction of a commercial vehicle. Further, the described viewing system relates exclusively to commercial vehicles and takes into account the given parameters in these vehicle classes, such as design height and to-be-monitored overall surfaces, as well as the direct view that is possible for a driver sitting on his/her driver's seat.

BRIEF DESCRIPTION OF THE FIGURES

In the following, the invention will be described in a purely exemplary manner with the assistance of the appended Figures, in which FIG. 1 schematically shows not directly-viewable subareas in an example of a truck of class N2 or N3.

DESCRIPTION OF THE PREFERRED EMBODIMENTS

Figure 1:
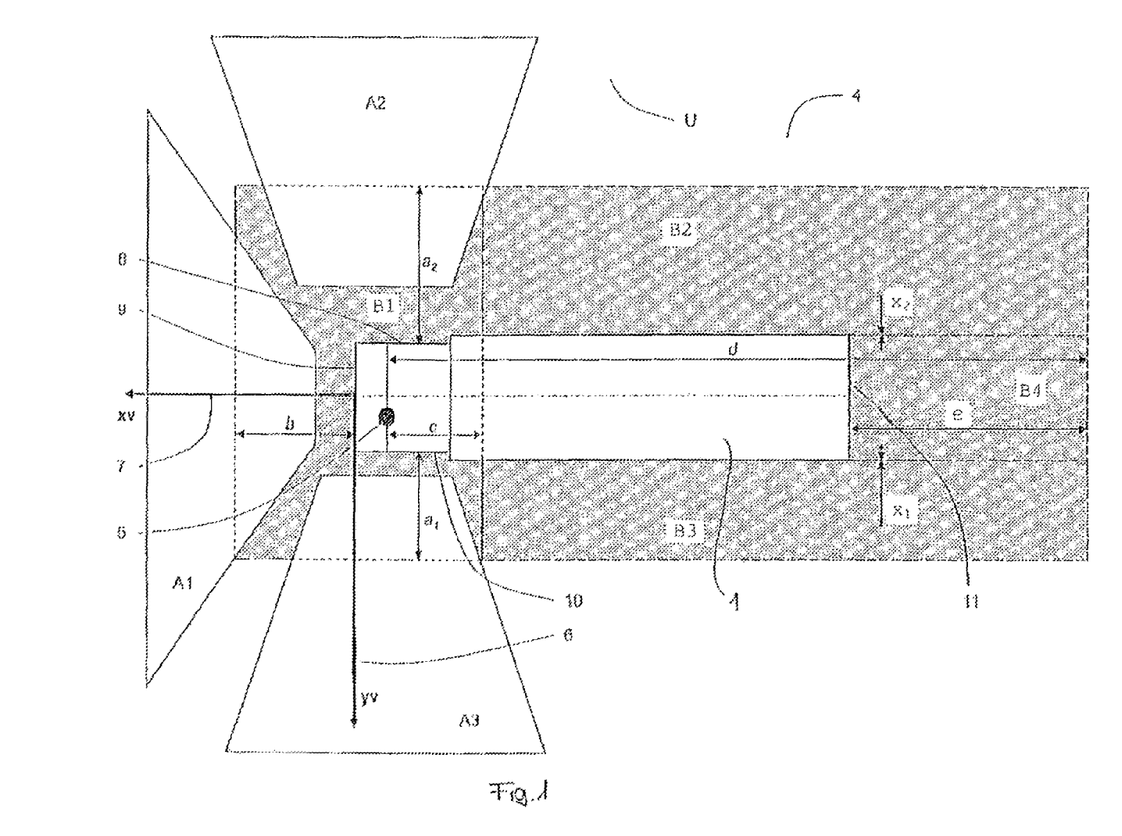

FIG. 1 schematically shows a plan view onto a commercial vehicle 1 for explaining and defining not directly-viewable subareas. The vehicle in this case is a truck of class N2 or N3. The depiction is a plan view from above onto the commercial vehicle.

There is a directly-visible area A around the commercial vehicle 1, i.e. in its close proximity, which means that the driver, who sits in the driver's seat and has his/her eye view point, e.g., at 5, can view the area without a means for indirectly viewing. The description and explanation of exemplary embodiments in this case is related to the situation of right-hand driving. It is understood that it also applies to vehicles, which are designed for left-hand driving, in which the driver sits on the right side of the vehicle cabin.

The directly-visible area A is comprised of a directly-visible area front A1, a directly-visible area passenger-side A2, and a directly-visible area driver-side A3.

Further, such areas that are not directly visible are also present around the commercial vehicle 1 in its close proximity. These not directly-visible areas B are formed according to FIG. 1 by a not directly-visible area front and front-side B1, not directly-visible areas middle side B2 and B3 and a not directly-visible area rear B4. Further, it should be noted in this definition that the commercial vehicle stands on an essentially flat surface, namely the ground plane 4.

Thus, according to FIG. 1, in an example of the truck of class N2 or N3, a subarea A1 on the ground plane is viewable through the front windshield, the subarea A2 is directly viewable through the side window on the passenger side and the subarea A3 is directly viewable through the side window on the driver side. The not directly-viewable overall area B thus corresponds to the ground plane 4 excluding the areas A1, A2, A3.

Furthermore, a Cartesian coordinate system is defined (see FIG. 2) such that the origin 13 of the coordinates lies on the ground plane 4 and corresponds to the projected middle point of the outermost front vehicle edge 9, i.e. it lies in the vehicle middle plane or vehicle middle axis 12. The planar Cartesian coordinate system is further spanned by the directions xv (7) and yv (6) on the ground plane so that the direction xv (7) lies on the planar projection of the vehicle middle longitudinal axis 12 or the vehicle middle longitudinal plane, and the direction yv (6) lies perpendicular thereto, wherein the positive yv-direction is the direction that points from the origin 13 of the coordinates towards the side, on which the driver can sit in his/her driver's seat, i.e. the left vehicle side in right-hand driving.

The not directly-viewable or -visible overall area B according to FIG. 1 is partitioned with the aid of this coordinate system into the following not directly-viewable subareas:

A subarea B1 front and side front, which on the one hand is a subset of the overall not directly-viewable or -visible area B and moreover is delimited by a parallel to the vehicle outer edge 8 on the passenger side at a distance a2≥4.5 m in a negative yv-direction 6, a parallel to the vehicle outer edge 9 front at a distance b≥3 m in a positive xv-direction 7, a parallel to the vehicle outer edge 9 front at a distance c≥0.75 m to the driver eye viewpoint 5 in a negative xv-direction 7 and a parallel to the vehicle outer edge 10 on the driver's side at a distance a1≥1 m in a positive yv-direction 6.

The not directly-visible subareas B2 and B3 side and rear side are likewise subsets of the overall not directly-viewable or -visible area B, wherein the subarea B2 is delimited by the passenger-side vehicle outer edge 8, a parallel to the passenger-side vehicle outer edge 8 at a distance a2≥4.5 m in the negative yv-direction 6, a parallel to the vehicle outer edge 9 front at a distance c≤0.75 m to the driver eye viewpoint 5 in the negative xv-direction 7 and a parallel to the vehicle outer edge 9 front at a distance d≥30 m to the driver eye viewpoint 5 in the negative xv-direction 7.

The subarea B3 is delimited by the driver-side vehicle outer edge 10, a parallel to the driver-side vehicle outer edge 10 at a distance a1≥1 m in the positive yv-direction 6, a parallel to the vehicle outer edge 9 front at a distance c≤0.75 m to the driver eye viewpoint 5 in the negative xv-direction 7 and a parallel to the vehicle outer edge 9 front at a distance d≥30 m to the driver eye viewpoint 5 in the negative xv-direction 7.

Furthermore, the not directly-visible subarea B4 rear is likewise a subset of the overall not directly-viewable or -visible area B and is delimited by the rear vehicle outer edge 11, a parallel to the vehicle outer edge 10 on the driver's side at a distance x1≥0 m in the positive yv-direction 6, a parallel to the vehicle outer edge 8 on the passenger side at a distance x2≥0 m in the negative yv-direction 6 and a parallel to the vehicle outer edge 11 rear at a distance e≥9 m in the negative xv-direction 7.

As mentioned, the description is related to the exemplary embodiment of a truck. Thus, the borders of the areas B1, B2, B3, B4 for this example are provided; however, they could be adapted and modified for other commercial vehicles in a corresponding manner. In any case, the not directly-viewable or -visible areas B1, B2, B3, B4 denote the areas around the commercial vehicle, which lie front and front side, in the middle side (left or right) and rear behind the vehicle and can not be directly viewed by the driver.

Figure 2:
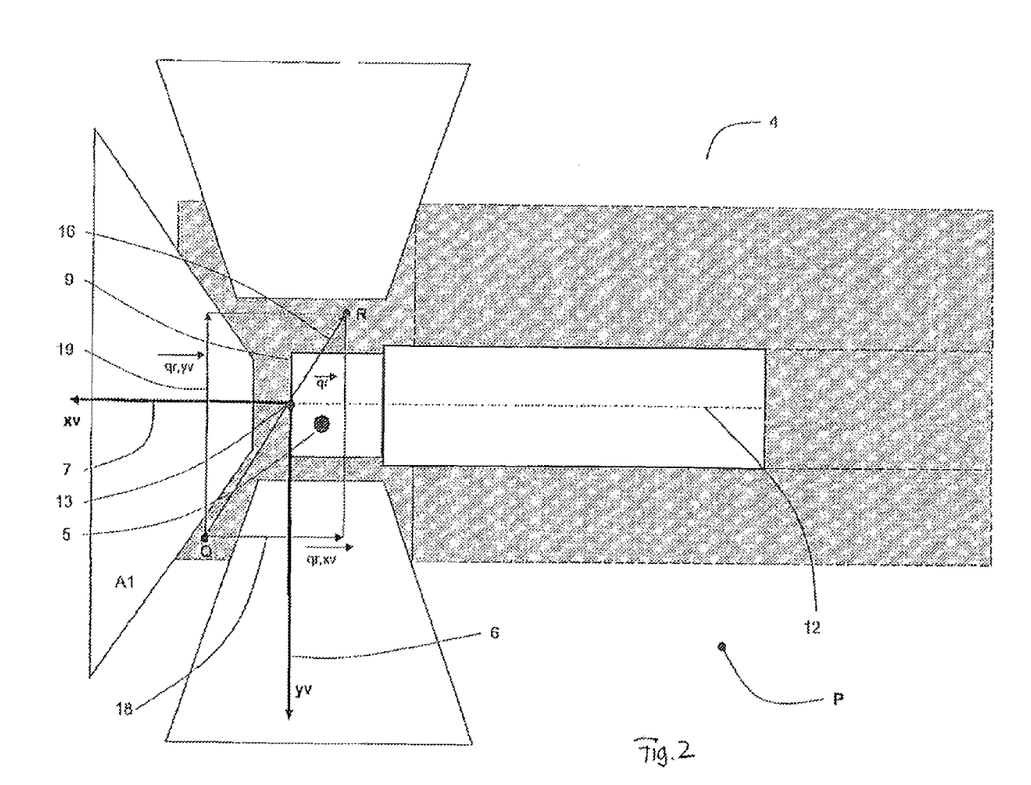
FIG. 2 is a corresponding view for explaining the image capture.

FIG. 2 schematically explains the image capture using the apparatus for image capturing.

The reference coordinate system is, as was explained in connection with FIG. 1, formed by a planar Cartesian coordinate system xv, yv on the ground plane 4, which has its origin of coordinates on the middle point of the outermost front vehicle edge 9, which middle point is projected onto the ground plane 4, and for the xv lies on a planar projection of the vehicle middle longitudinal axis 12 and extends and is directed towards the front in the forward driving direction of the vehicle, i.e. away from it, and wherein yv lies perpendicular thereto, wherein the positive yv-direction is that which points towards the driver's side of the vehicle 1.

According to a preferred embodiment, the image capture unit(s) KE1, KE2, KE3 (see FIG. 4 and/or FIG. 6) are (is) attached at an attachment height h in the commercial vehicle of 1.40 m≤h≤3.80 m above the ground plane 4. A very minimal distortion is achieved thereby.

Figure 4:
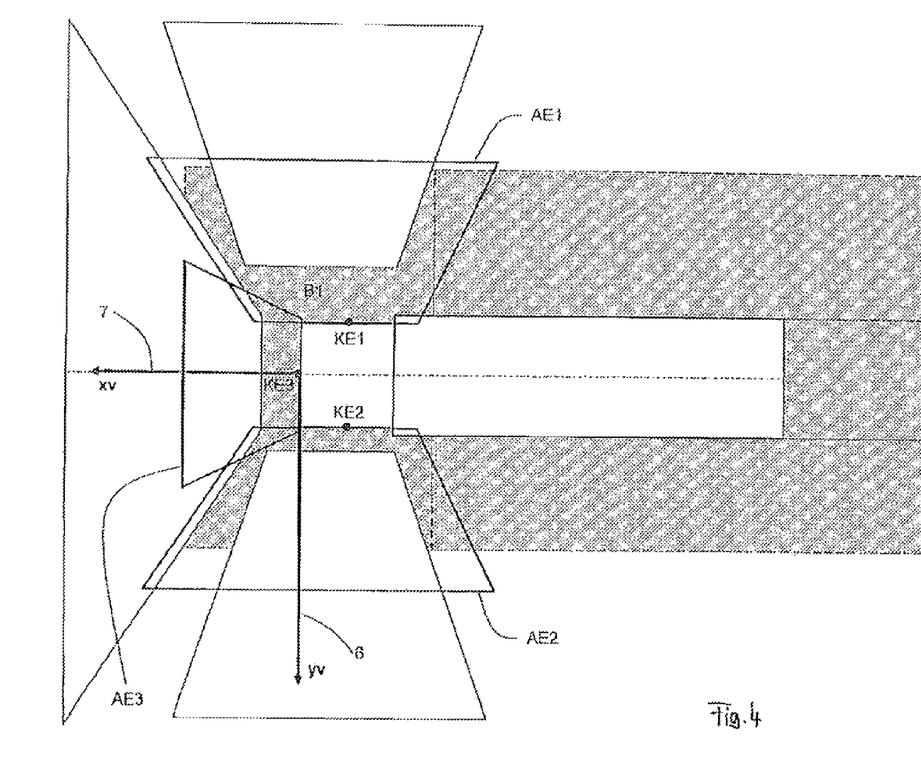
FIG. 4 schematically explains the image capture of a first exemplary embodiment.
Figure 6:
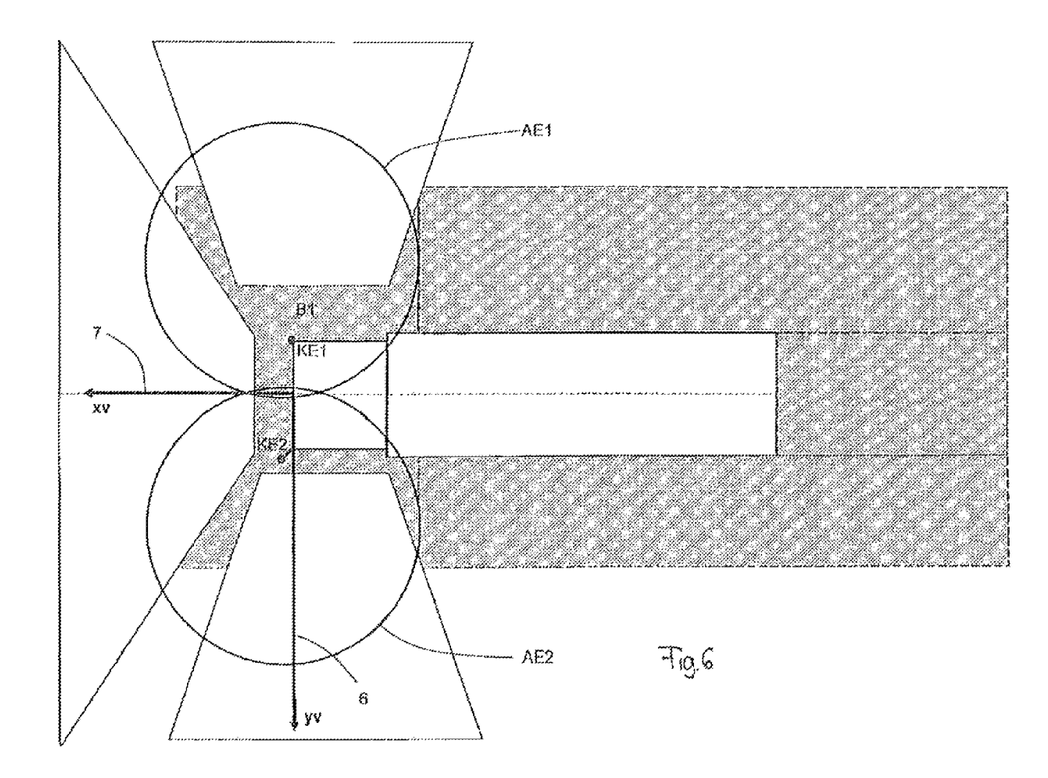
FIG. 6 schematically explains the image capture of an additional exemplary embodiment.

At least one point set P is mapped with the assistance of the image capture units KE1, KE2, KE3, which point set P contains one of the not directly-visible areas B1 or the not directly-visible areas B1∪B4 or the not directly-visible areas B1∪B2∪B4 or the not directly-visible areas B1∪B2∪B3∪B4.

Two exemplary points Q and R of this point set are schematically plotted in FIG. 2. The qr, xv-vector component 18 corresponds in this case to the xv component of the vector qr 16 in the xv-direction 7; the qr, yv-vector component 19 corresponds in accordance with the components of the vector qr 16 in the yv-direction 6.

Figure 3:
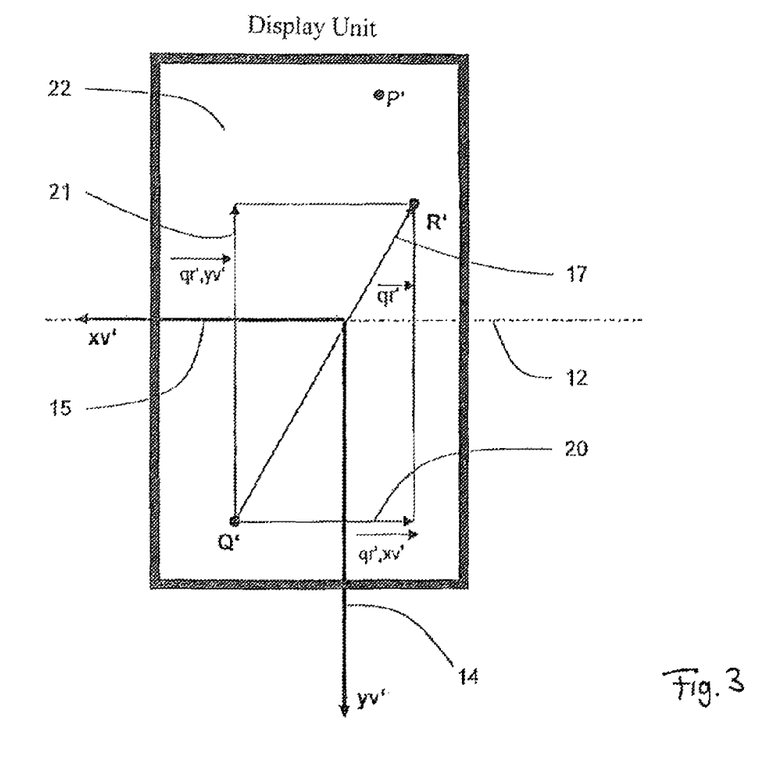
FIG. 3 shows a schematic depiction of the display unit of the reproduction device for explaining the projections.

FIG. 3 schematically shows an image reproduction unit and serves to explan the definitions of the image reproduction unit using the image display unit.

The apparatus for image display in this case is, e.g., a conventional display or, e.g., a projection onto one of the structural columns of the vehicle cabin.

The apparatus for image display can be designed such that various areas are depicted as a function of the driving situation. For example, it is expedient to always display the not directly-visible subarea B1 when stationary or when driving forward, the not directly-visible area B4 when initiating rearward driving and for example, the subareas B2∪B3 during active ignition.

In any case, it is applicable for all subareas B1, B2, B3, B4, which are reproduced simultaneously at a certain time point, that an image P' of a subset of the point set P is reproduced on an image plane 22, wherein a point Q is reproduced on point Q', a point R is reproduced on point R' and the original reference coordinate system, which is spanned by the xv-direction 7 and the yv-direction 6, is reproduced on the image reference coordinate system with the xv'-direction 15 and the yv'-direction 14. In the image reference coordinate system, it is applicable that the xv'-direction 15 lies on the reproduction of the vehicle middle longitudinal axis 12 and the yv'-direction 14 lies perpendicular to the xv'-direction 15.

The reproduction is, as is recognizable from FIG. 3, designed such that the direction of the vector component qr', yv' 21 and the direction of the vector component qr, yv 19 are the same. Likewise, the direction of the vector component qr', xv' 20 and the direction of the vector component qr, xv 18 are the same.

Figure 5:
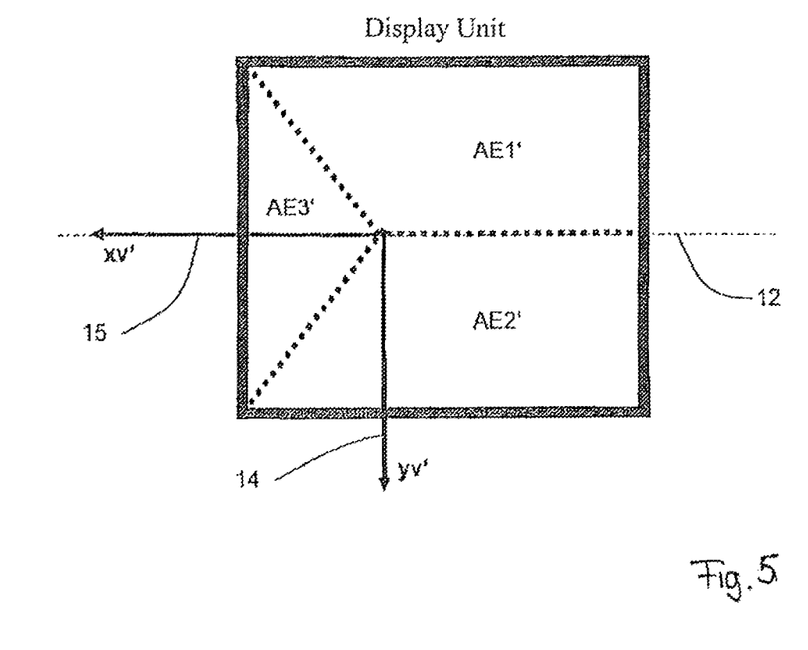
FIG. 5 schematically shows the image reproduction of the first exemplary embodiment.

In the exemplary embodiments shown in FIGS. 4 and 5, the not directly-visible area B1 is sensed by units for image capture KE1, KE2, KE3 with their capture areas AE1, AE2, AE3. The image capture units in this case are preferably disposed at a height h of 1.40 m≤h≤3.80 m above the ground plane 4. The projection corresponding to the apparatus for image display is depicted in FIG. 5, where it is recognizable that a display appears, which is easily understandable and perceivable for the driver, due to the selection of the reference coordinate system, which is spanned by the vx-direction and the yv-direction, and due to the selection of the image reference coordinate system, which is spanned by the xv-direction and the yv-direction and is selected to that the xv-direction lies in the vehicle middle axis 12 or the xv'-direction lies in the projection thereof, as well as by the fact that the projection of the vector QR onto Q'R' takes place corresponding to the above-provided definition.

Figure 7:
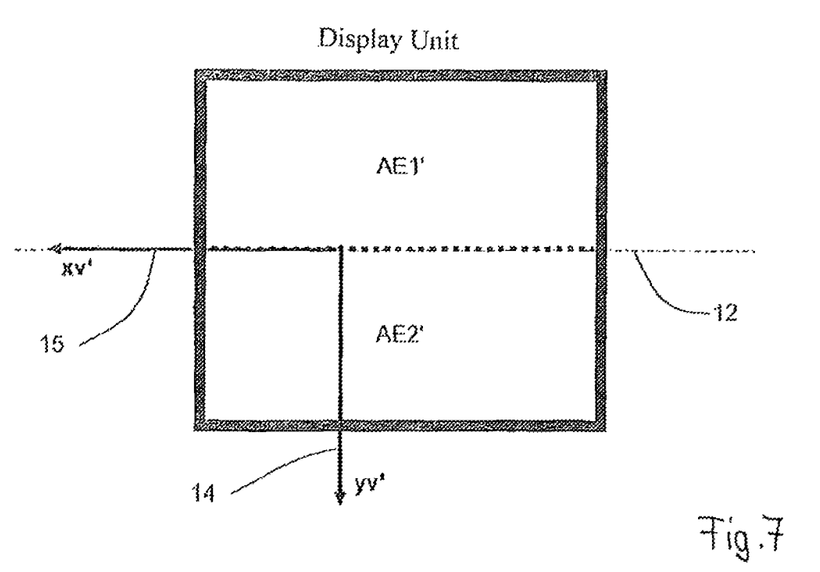
FIG. 7 schematically shows the image reproduction of the additional exemplary embodiment.

In FIG. 6 and FIG. 7, a further exemplary embodiment is shown, which includes two units for image capture KE1 and KE2, whose captured area is depicted in a unit for image reproduction according to the above-explained projection. In this case the area B1, which is not directly visible, is sensed using two units for image capture KE1, KE2 having the capture areas AE1, AE2 and, as is depicted in FIG. 7, is reproduced by the projection, as explained above, onto the unit for image reproduction as areas AE1', AE2'.

REFERENCE NUMBER LIST

A Directly-visible area
A1 Directly-visible area front
A2 Directly-visible area passenger-side
A3 Directly-visible area driver-side
B Not directly-visible area
B1 Not directly-visible area front and front-side
B2, B3 Not directly-visible area middle-side
B4 Not directly-visible area rear
KE1 Image capture unit
KE2 Image capture unit
KE3 Image capture unit
AE1 Image sensing area of the image capture unit KE1
AE2 Image sensing area of the image capture unit KE2
AE3 Image sensing area of the image capture unit KE3
P Point set
Q Point
R Point
U Space
P' Image of the point set P
Q' Image of point Q
R' Image of point R
a1, a2, b, c, d, e, x1, x2 Distance
1 Commercial vehicle
4 Ground plane
5 Eye view point of the driver
6 yv-direction reference coordinate system
7 xv-direction reference coordinate system
8 Vehicle outer edge passenger-side
9 Vehicle outer edge front side
10 Vehicle outer edge driver side
12 Vehicle middle longitudinal axis
13 Origin of coordinates
14 yv'-direction reference coordinate system
15 xv'-direction reference coordinate system
16 Vector QR
17 Vector Q'R'
18 qr, xv vector component
19 qr, yv vector component
20 qr', xv' vector component
21 qr', yv' vector component

The invention claimed is:

1. An electronic viewing system for capturing and displaying a subspace (U) of a not directly-viewable space in the surroundings of a commercial vehicle on a ground plane, including:
an apparatus for image capturing, comprising at least one unit for imaging the subspace (U), and an apparatus, which is disposed in an interior of the vehicle, for image display for displaying a reproduction of the subspace (U), the apparatus for image display including at least one unit for image display,
wherein the apparatus for image capturing captures at least one point set (P) $\in$ (U), which includes two arbitrary points (Q) and (R),
and wherein the at least one point set (P) results from the cross-section of the ground plane with the subspace (U)
and wherein the ground plane is spanned by Cartesian coordinates xv and yv and wherein xv lies in a vehicle middle longitudinal axis,
wherein the apparatus for image capturing displays an image (P') of the point set (P) in, an image plane which includes the image (Q') of the point (Q) and the image (R') of the point (R)
and wherein the image plane is spanned by Cartesian coordinates xv' and yv'
and wherein xv' lies on the a reproduction of the vehicle middle longitudinal axis in the image plane, wherein
a projection QR, xv of a vector QR on the ground plane onto xv and a projection Q'R', xv' of a vector Q'R' on the image plane onto xv' have a same first direction, and wherein a projection QR, yv of a vector QR on the ground plane onto yv and a projection Q'R', yv' of a vector Q'R' on the image plane onto yv' have a same second direction.

2. The electronic viewing system according to claim 1, wherein the commercial vehicle is a truck of class N2 or N3 or a bus of class M2 or M3.

3. The electronic viewing system according to claim 2, wherein the point set (P) describes an area (B1),
wherein (B1) is delimited:
by a parallel to the vehicle outer edge passenger-side at a distance $(a_2) \geq 4.5$ m in a negative yv-direction, and
by a parallel to the vehicle outer edge front at a distance $(b) \geq 3$ m in a positive xv-direction, and
by a parallel to the vehicle outer edge front at a distance $(c) \geq 0.75$ m to the driver eye viewpoint in a negative xv-direction and by a parallel to the vehicle outer edge driver-side at a distance $(a_1) \geq 1$ m in a positive yv-direction.

4. The electronic viewing system according to claim 2, wherein the point set (P) describes an area (B2),
wherein (B2) is delimited:
by the vehicle outer edge passenger-side and by a parallel to the vehicle outer edge passenger-side at a distance $(a_2) \geq 4.5$ m in a negative yv-direction, and p1 by a parallel to the vehicle outer edge front at a distance $(c) \leq 0.75$ m to the driver eye viewpoint in a negative xv-direction and by a parallel to the vehicle outer edge front at a distance $(d) \geq 30$ m to the driver eye viewpoint in a negative xv-direction.

5. The electronic viewing system according to claim 2, wherein the point set (P) describes an area (B3),
wherein (B3) is delimited:
by the vehicle outer edge driver-side, and
by a parallel to the vehicle outer edge driver-side at a distance $(a_1) \geq 1$ m in a positive yv-direction, and
by a parallel to the vehicle outer edge front at a distance $(c) \leq 0.75$ m to the driver eye viewpoint in a negative xv-direction and by a parallel to the vehicle outer edge front at a distance $(d) \geq 30$ m to the driver eye viewpoint in a negative xv-direction.

6. The electronic viewing system according to claim 2, wherein the point set (P) describes an area (B4),
wherein (B4) is delimited:
by the vehicle outer edge rear, and
by a parallel to the vehicle outer edge driver-side at a distance $(x_1) \geq 0$ m in a positive yv-direction, and
by a parallel to the vehicle outer edge passenger-side at a distance $(x_2) \geq 0$ m in a negative yv-direction and by a parallel to the vehicle outer edge rear at a distance (e)≥9 m in a negative xv-direction.

7. The electronic viewing system according to claim 2, wherein the point set (P) describes the union of the areas (B1) and (B4).

8. The electronic viewing system according to claim 2, wherein the point set (P) describes the union of the areas (B1) and (B2).

9. The electronic viewing system according to claim 2, wherein the point set (P) describes the union of the areas (B1, B2, B4).

10. The electronic viewing system according to claim 2, wherein the point set (P) describes the union of the areas (B1, B2, B3).

11. The electronic viewing system according to claim 2, wherein the point set (P) describes the union of the areas (B1, B2, B3, B4).

12. The electronic viewing system according to claim 1, wherein the selection of the depicted areas depends on the driving situation.

13. The electronic viewing system according to claim 1, wherein the unit for capturing is disposed at a height h above the road surface, wherein 1.40 m≤h≤3.80 m.

14. A commercial vehicle, including an electronic viewing system according to claim 1.

15. An electronic viewing system for capturing and displaying images of at least one region near a vehicle which at least one region is not directly viewable by a driver of the vehicle sitting in a drivers seat of the vehicle and wherein the vehicle includes a longitudinal center plane perpendicular to a ground plane, the ground plane intersecting the longitudinal center plane at a ground plane line, the system comprising:
 a camera for capturing an image of the at least one region including first and second arbitrary points on the ground plane, the first and second arbitrary points being connected by a first vector; and
 a display in an interior of the vehicle for displaying an image of the at least one region on an image plane corresponding to the ground plane, the display including an indication of the longitudinal center plane of the vehicle,
 wherein the display displays on the image plane a first virtual point corresponding to the first arbitrary point and a second virtual point corresponding to the second arbitrary point and wherein the first virtual point is connected to the second virtual point by a second vector; and
 wherein a relationship between the second vector and the indication of the longitudinal center plane of the vehicle is the same as a relationship between the first vector and the ground plane line.

16. The electronic viewing system according to claim 15, wherein the first vector intersects the ground plane line at a first angle, wherein the second vector intersects the indication of the longitudinal center plane at a second angle and wherein the first angle is equal to the second angle.

17. The electronic viewing system according to claim 15, wherein the vehicle comprises a truck or a bus.

* * * * *

UNITED STATES PATENT AND TRADEMARK OFFICE
CERTIFICATE OF CORRECTION

| | |
|---|---|
| PATENT NO. | : 9,232,195 B2 |
| APPLICATION NO. | : 13/983264 |
| DATED | : January 5, 2016 |
| INVENTOR(S) | : Werner Lang et al. |

It is certified that error appears in the above-identified patent and that said Letters Patent is hereby corrected as shown below:

Claims

In claim 1, column 8, line 15, delete "the" before "a reproduction".

In claim 4, column 8, line 43, delete "p1" and insert there a hard return.

Signed and Sealed this
Eighth Day of March, 2016

Michelle K. Lee
*Director of the United States Patent and Trademark Office*